US011622399B2

(12) United States Patent
Takinami et al.

(10) Patent No.: US 11,622,399 B2
(45) Date of Patent: Apr. 4, 2023

(54) TRANSMISSION DEVICE, TRANSMISSION METHOD, RECEPTION DEVICE, AND RECEPTION METHOD

(71) Applicant: Panasonic Intellectual Property Corporation of America, Torrance, CA (US)

(72) Inventors: Koji Takinami, Kanagawa (JP); Naganori Shirakata, Kanagawa (JP); Tomoya Urushihara, Kanagawa (JP); Masashi Kobayashi, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 191 days.

(21) Appl. No.: 16/815,781

(22) Filed: Mar. 11, 2020

(65) Prior Publication Data

US 2020/0214061 A1    Jul. 2, 2020

Related U.S. Application Data

(63) Continuation of application No. PCT/JP2018/029197, filed on Aug. 3, 2018.

(30) Foreign Application Priority Data

Sep. 14, 2017  (JP) .............................. JP2017-176875

(51) Int. Cl.
*H04W 76/14*     (2018.01)
*H04B 7/0413*   (2017.01)
(Continued)

(52) U.S. Cl.
CPC .......... *H04W 76/14* (2018.02); *H04B 7/0413* (2013.01); *H04B 7/18506* (2013.01); *H04W 28/0278* (2013.01); *H04W 28/14* (2013.01)

(58) Field of Classification Search
None
See application file for complete search history.

(56) References Cited

U.S. PATENT DOCUMENTS 5,621,414 A * 4/1997 Nakagawa ................ G01S 5/14
342/463
5,706,274 A * 1/1998 Angelico .............. H04L 12/413
370/445
(Continued)

FOREIGN PATENT DOCUMENTS

JP     H09-162930 A    6/1997
JP     2007-080161 A   3/2007
(Continued)

OTHER PUBLICATIONS

Honma et al., "Short Range MIMO Communication", IEEE European Conference on Antennas and Propagation, NTT Network Innovation Laboratories, NTT Corporation, Yokosuka, Japan, 2009, pp. 1763-1767, (5 pages).
(Continued)

*Primary Examiner* — Adnan Baig
(74) *Attorney, Agent, or Firm* — Seed IP Law Group LLP

(57) ABSTRACT

A transmission device includes N wireless transmission circuits and N transmission buffers. N is an integer equal to or greater than two. Each of the N transmission buffers is connected to a respective wireless transmission circuit of the N wireless transmission circuits. At least a part of a piece of delivery data is stored in each of the N transmission buffers before the N wireless transmission circuits establish wireless links. The N wireless transmission circuits are instructed to transmit the piece of delivery data stored in the N transmission buffers after the N wireless transmission circuits establish the wireless links.

5 Claims, 8 Drawing Sheets

(51) Int. Cl.
H04B 7/185 (2006.01)
H04W 28/02 (2009.01)
H04W 28/14 (2009.01)

(56) References Cited

U.S. PATENT DOCUMENTS

2005/0243722 A1* 11/2005 Liu .................. H04L 47/15
370/235
2008/0291919 A1* 11/2008 Dunbar ............... H04L 47/74
370/395.3
2010/0322188 A1* 12/2010 Nagatake ........... H04L 47/2433
370/331
2016/0295258 A1 10/2016 Matsuo
2017/0019333 A1* 1/2017 Burgess ............... H04W 28/14
2018/0262749 A1* 9/2018 Goldentouch ........... G06T 7/85

FOREIGN PATENT DOCUMENTS

JP 2018-056974 A 4/2018
WO 2015/075956 A1 5/2015

OTHER PUBLICATIONS

IEEE Computer Society, "Part 11: Wireless LAN Medium Access Control (MAC) and Physical Layer (PHY) Specifications; Amendment 3: Enhancements for Very High Throughput in the 60 GHz Band," IEEE Std 802.11ad™-2012, 2012, 628 pages.

* cited by examiner

TRANSMISSION DEVICE, TRANSMISSION METHOD, RECEPTION DEVICE, AND RECEPTION METHOD

RELATED APPLICATIONS

This application is a continuation of PCT International Application No. PCT/JP2018/029197, filed on Aug. 3, 2018, which claims the benefit of foreign priority of Japanese patent application 2017-176875 filed on Sep. 14, 2017, the contents all of which are incorporated herein by reference.

BACKGROUND

1. Technical Field

The present disclosure is related to a transmission device, a transmission method, a reception device, and a reception method for wireless transmission of data.

2. Background Art

In recent years, a size of delivery data that is handled has been greatly increasing. For example, a total size of delivery data related to one or more contents that are viewed by passengers on an aircraft is approximately 500 gigabytes (GB). At present, in order to update the delivery data, operators exchange hard disk drives (HDD) while the aircraft is staying at an airport. Updating this delivery data using wireless communication could reduce a number of man-hours of operators. This also applies to, for example, updating delivery data of video advertisement on a train or a bus.

As a means for performing wireless communication of a large volume of delivery data like this at a high speed, wireless communication using a millimeter wave has drawn attention. For example, IEEE802.11ad-2012 specifications, "Part 11: Wireless LAN Medium Access Control (MAC) and Physical Layer (PHY) Specifications", IEEE 2012 discloses that wireless communication at an effective speed of approximately 2 gigabits per second (Gbps) can be performed in millimeter wave communication using a 60 gigahertz (GHz) band. Moreover, Naoki Honma, Kentaro Nishimori, Tomohiro Seki, and Masato Mizoguchi, "Short Range MIMO Communication", IEEE European Conference on Antennas and Propagation, 2009 discloses a technique that further increases the communication speed through simultaneous establishment of multiple wireless links using a millimeter wave.

SUMMARY

In a case where a speed of wireless communication is increased as described above, the communication speed in a section prior to the wireless communication in a transmission device (for example, a section of a wired local area network (LAN)) becomes a bottle neck, rather than the wireless communication section between the transmission device and a reception device.

One non-limiting and exemplary embodiment of the present disclosure facilitates providing a transmission device, a transmission method, a reception device, and a reception method capable of transmitting delivery data in a shorter time by avoiding or suppressing a speed in a wireless communication section between the transmission device and the reception device being determined by a communication speed in a communication section prior to the wireless communication.

The transmission device according to one aspect of the present disclosure includes: N wireless transmission circuits configured to establish wireless links with a reception device, and to transmit a piece of delivery data to the reception device, N being an integer equal to or greater than two; N transmission buffers, each of the N transmission buffers being connected to a respective wireless transmission circuit of the N wireless transmission circuits; distribution control circuitry configured to store at least a part of the piece of delivery data in each of the N transmission buffers before the N wireless transmission circuits establish the wireless links; and transmission control circuitry configured to instruct the N wireless transmission circuits to transmit the piece of delivery data stored in the N transmission buffers after the N wireless transmission circuits establish the wireless links.

Note that these general or specific aspects may be implemented by a system, a method, an integrated circuit, a computer program, or a recording medium, and may also be implemented by any combination of the system, the device, the method, the integrated circuit, the computer program, and the recording medium.

According to one aspect of the present disclosure, it is possible to transmit delivery data in a shorter time through avoiding or suppressing a speed in a wireless communication section between a transmission device and a reception device being determined by a communication speed in a communication section prior to the wireless communication.

Additional advantages and effects of one aspect of the present disclosure will become apparent from the specification and drawings. The advantages and/or effects may be individually obtained by several exemplary embodiments and features of the specification and drawings, which need not all be provided in order to obtain one or more of such advantages and/or effects.

DETAILED DESCRIPTION OF PREFERRED EMBODIMENTS

Figure 1:
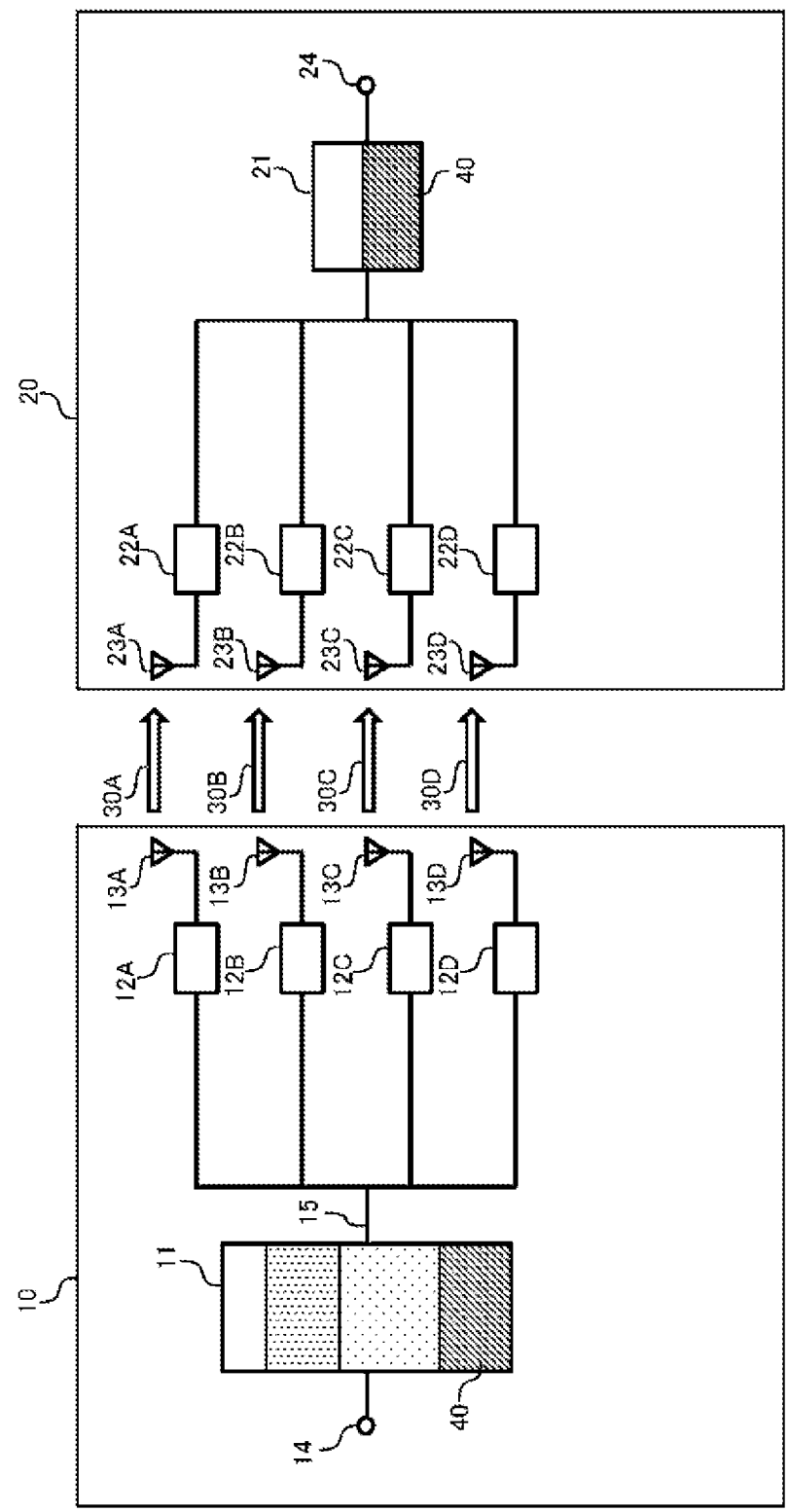
FIG. 1 is a block diagram illustrating a configuration example of a transmission device and a reception device.

Transmission device 10 of FIG. 1 includes transmission data storage unit 11, N (N is an integer of 2 or more. In FIG. 1, N is 4) wireless transmitters (wireless transmission units) 12A, 12B, 12C, 12D, and N transmission antennas 13A, 13B, 13C, 13D. Wireless transmitters 12A, 12B, 12C, 12D are connected to N transmission antennas 13A, 13B, 13C, 13D on a one-to-one basis, respectively.

Reception device 20 of FIG. 1 includes reception data storage unit 21, N wireless receivers 22A, 22B, 22C, 22D, and N reception antennas 23A, 23B, 23C, 23D. N wireless receivers (wireless reception units) 22A, 22B, 22C, 22D are connected to N reception antennas 23A, 23B, 23C, 23D on a one-to-one basis, respectively.

Transmission antennas 13A, 13B, 13C, 13D establish wireless links 30A, 30B, 30C, 30D with reception antennas 23A, 23B, 23C, 23D on a one-to-one basis, respectively.

Transmission device 10 stores delivery data 40 input from input terminal 14 in transmission data storage unit 11. Delivery data 40 in transmission data storage unit 11 is then distributed to four systems and input into wireless transmitters 12A, 12B, 12C, 12D. Wireless transmitters 12A, 12B, 12C, 12D transmit delivery data 40 distributed to the four systems from transmission antennas 13A, 13B, 13C, 13D, respectively.

In reception device 20, wireless receivers 22A, 22B, 22C, 22D receive delivery data 40 distributed to the four systems from reception antennas 23A, 23B, 23C, 23D, store delivery data 40 in reception data storage unit 21, respectively, and combine delivery data 40. Reception device 20 then outputs delivery data 40 in reception data storage unit 21 from output terminal 24 where necessary.

Here, when a communication speed of wired local area network (LAN) 15 that connects transmission data storage unit 11 to wireless transmitters 12A to 12D is slow compared to the communication speed of wireless links 30A to 30D that connects transmission device 10 to reception device 20, the communication speed of delivery data 40 to reception device 20 is determined by the communication speed of wired LAN 15. That is, even when the communication speeds of wireless links 30A to 30D between transmission device 10 and reception device 20 are fast, the communication speed of wired LAN 15 becomes a bottle neck and thus wireless transmission of delivery data 40 to reception device 20 cannot be easily performed at a high speed (in a short period of time).

For example, in a case where a maximum communication speed of each of wireless links 30A to 30D is 2 gigabits per second (Gbps), the communication speed when wireless links 30A to 30D of the four systems are combined is 8 Gbps at most. However, in a case where the maximum communication speed of wired LAN 15 is 1 Gbps, the communication speed of delivery data 40 is determined to be 1 Gbps at the maximum.

Therefore, we have performed examinations in order to avoid the communication speed of delivery data 40 being determined by the communication speed in a section (wired LAN 15) prior to wireless communication.

Hereinafter, exemplary embodiments of the present disclosure will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid unnecessary redundancy in the following description and to facilitate understanding by those skilled in the art.

Note that the attached drawings and the following description are provided for those skilled in the art to fully understand the present disclosure, and are not intended to limit the subject matter as described in the appended claims.

Further, when the same kind of elements are described in distinction from each other, reference marks may be used such as "wireless transmitter 103A" and "wireless transmitter 103B". When the same kind of elements are described without being distinguished from each other, a common number among the reference marks such as "wireless transmitters 103" may be used.

First Exemplary Embodiment

<Outline of Data Delivery System>

Figure 2:
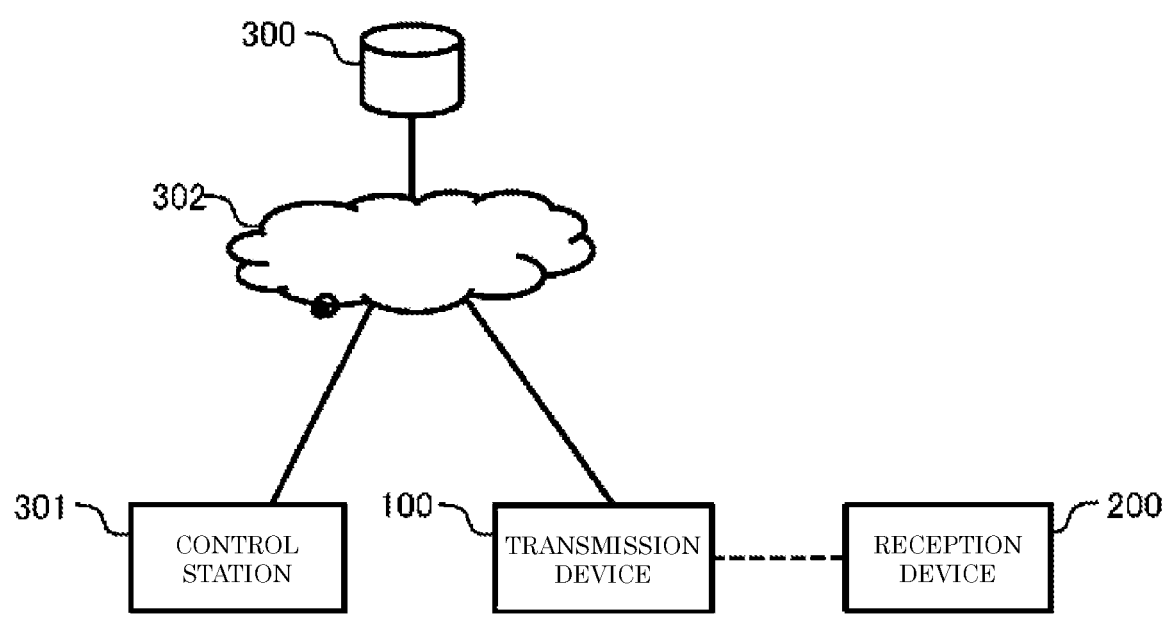
FIG. 2 is a block diagram illustrating an outline of a configuration of a data delivery system.

First, an outline of a data delivery system according to a first exemplary embodiment will be described below with reference to FIG. 2.

The data delivery system includes transmission device 100, reception device 200, delivery data server 300, and control station 301. Delivery data server 300, control station 301, and transmission device 100 are connected to internet network 302. By controlling delivery data server 300 and transmission device 100, control station 301 can transmit delivery data to transmission device 100 from delivery data server 300 via internet network 302. Transmission device 100 can transmit the delivery data to reception device 200 by wireless communication.

<Configurations of Transmission Device and Reception Device>

Next, with reference to FIG. 3, configurations of transmission device 100 and reception device 200 will be described.

Transmission device 100 includes transmission data storage unit 101, N transmission buffers 102A, 102B, 102C, 102D (in FIG. 2, N is 4), N wireless transmitters 103A, 103B, 103C, 103D, N transmission antennas 104A, 104B, 104C, 104D, distribution controller (distribution control unit) 105, and transmission controller (transmission control unit) 106.

Transmission data storage unit 101 is connected to transmission buffers 102A, 102B, 102C, 102D via wired LAN 111. Transmission buffers 102A, 102B, 102C, 102D are connected to wireless transmitters 103A, 103B, 103C, 103D on a one-to-one basis, respectively. Wireless transmitters 103A, 103B, 103C, 103D are connected to transmission antennas 104A, 104B, 104C, 104D on a one-to-one basis, respectively.

In transmission data storage unit 101, delivery data 310 is stored in advance. For example, delivery data 310 that has been transmitted from delivery data server 300 to transmission device 100 according to an instruction of control station 301 is stored in transmission data storage unit 101 via input terminal 110. In transmission data storage unit 101, several pieces of delivery data may be stored in advance.

Wireless transmitters 103A, 103B, 103C, 103D establish wireless links 400A, 400B, 400C, 400D with reception device 200 via transmission antennas 104A, 104B, 104C, 104D, respectively. For this wireless link communication, a millimeter wave whose communication speed is relatively fast is used. As a wireless communication system using a millimeter wave, wireless high definition (HD), wireless gigabit (WiGig), and IEEE802.11ad/ay can be exemplified. Moreover, through the establishment of a plurality of wireless links 400, the communication speed in this wireless section becomes faster. In this case, the communication speed in this wireless section becomes faster than the communication speed of wired LAN 111 between transmission data storage unit 101 and transmission buffers 102.

Moreover, based on an instruction from transmission controller (transmission control unit) 106, wireless transmitters 103A, 103B, 103C, 103D transmit, to reception device 200, at least a part of delivery data 310 (for example, non-transmitted data of transmission device 100 as a whole is selected) in transmission buffers 102A, 102B, 102C, 102D via wireless links 400A, 400B, 400C, 400D, respectively.

Before wireless transmitters (wireless transmission units) 103 establish wireless links 400, distribution controller (distribution control unit) 105 distributes delivery data 310 in transmission data storage unit 101 to transmission buffers 102A, 102B, 102C, 102D via wired LAN 111 and stores delivery data 310 in transmission buffers 102A, 102B, 102C, 102D. The data distributed and stored in transmission buffers 102 may be referred to as delivery data. Alternatively, a configuration may be adopted in which transmission data storage unit 101 and distribution controller 105 are included in a server device, instead of inside transmission device 100, and the server device and transmission device 100 are connected to each other via wired LAN 111.

After wireless transmitters 103 establish wireless links 400, transmission controller 106 instructs wireless transmitters 103 to transmit the delivery data in transmission buffers 102.

Reception device 200 includes reception data storage unit 201, N reception buffers 202A, 202B, 202C, 202D, N wireless receivers 203A, 203B, 203C, 203D, N reception antennas 204A, 204B, 204C, 204D, and reception controller (reception control unit) 205.

Reception data storage unit 201 is connected to reception buffers 202A, 202B, 202C, 202D via wired LAN 211. Reception buffers 202A, 202B, 202C, 202D are connected to wireless receivers (wireless reception units) 203A, 203B, 203C, 203D on a one-to-one basis, respectively. Wireless receivers 203A, 203B, 203C, 203D are connected to reception antennas 204A, 204B, 204C, 204D on a one-to-one basis, respectively. Note that in FIG. 3, since different data is stored, positions of hatched portion of reception buffers 202A, 202B, 202C, 202D are different from each other.

Wireless receivers 203A, 203B, 203C, 203D establish wireless links 400A, 400B, 400C, 400D with transmission device 100 via reception antennas 204A, 204B, 204C, 204D, respectively.

Moreover, wireless receivers 203A, 203B, 203C, 203D receive the delivery data from transmission device 100 via wireless links 400A, 400B, 400C, 400D, and stores the delivery data in reception buffers 202A, 202B, 202C, 202D, respectively.

Reception controller (Reception control unit) 205 transmits the delivery data stored in reception buffers 202A, 202B, 202C, 202D to reception data storage unit 201 via wired LAN 211, and combines and stores the delivery data. In this way, delivery data 310 is stored in reception data storage unit 201. Delivery data 310 stored in reception data storage unit 201 is output from output terminal 210 where necessary.

A control signal for establishing wireless links 400 may be transmitted by any of wireless transmitters 103A to 103D from transmission antennas 104 to reception antennas 204, or may be transmitted by any of wireless receivers 203A to 203D from reception antennas 204 to transmission antennas 104.

Figure 3:
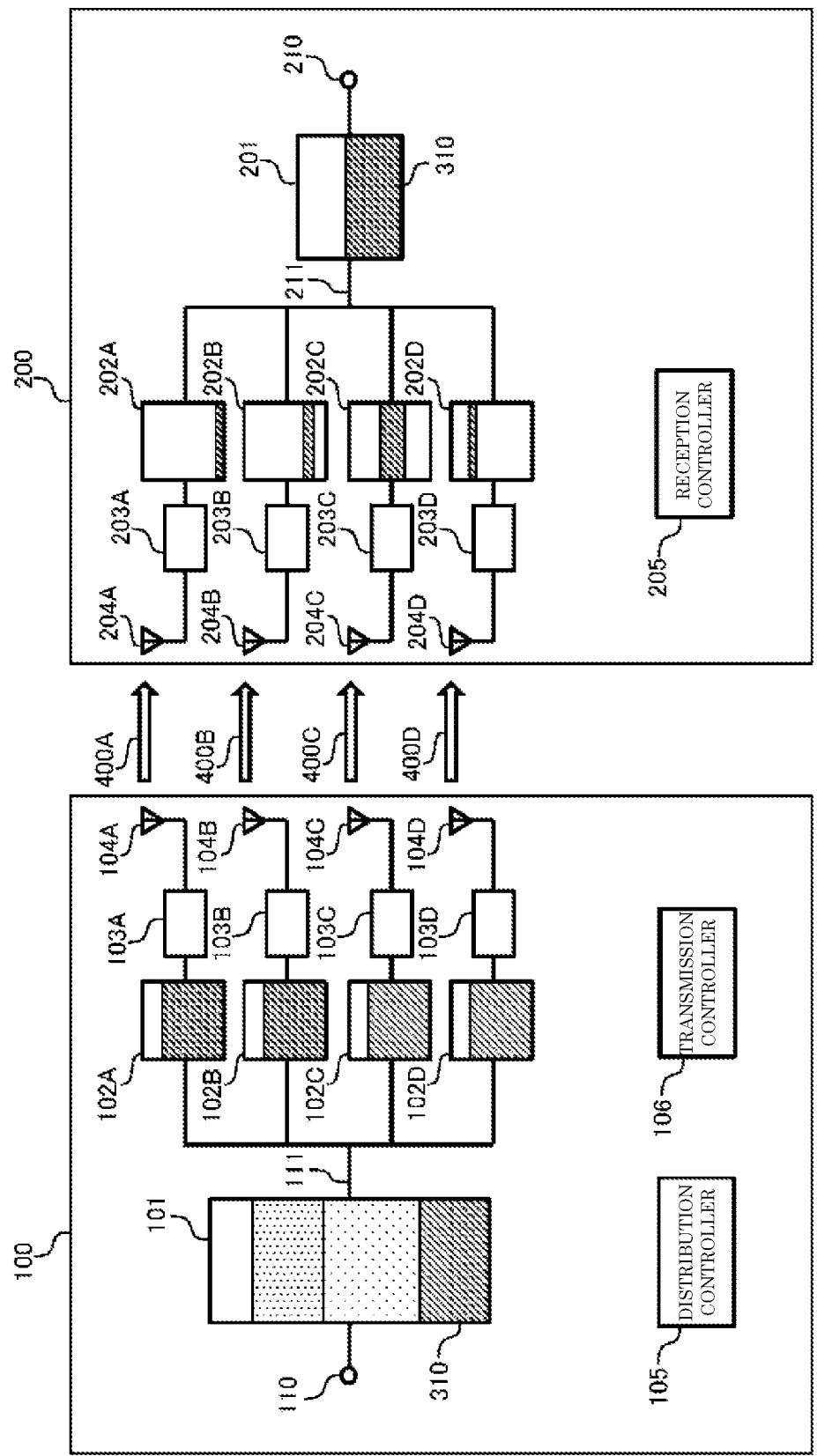
FIG. 3 is a block diagram illustrating a configuration example of a transmission device and a reception device according to a first exemplary embodiment.

FIG. 3 illustrates a case where a number of each of transmission buffers 102, wireless transmitters 103, transmission antennas 104, reception buffers 202, wireless receivers 203, reception antennas 204, and wireless links 400 is four, but the present exemplary embodiment is not limited thereto. The number of these elements may be more than or equal to two (that is N≥2). Alternatively, different frequency channels may be used for the wireless communication.

Alternatively, wired LANs 111, 211 may be, for example, other high speed wired interface using a universal serial bus (USB) or peripheral component interconnection (PCI) Express.

Moreover, a transmission direction of data is not limited to one direction. For example, two pairs of transmission devices 100 and reception devices 200 may be combined in such a manner that the data is transmitted bidirectionally.

Moreover, data stored in transmission data storage unit 101, transmission buffers 102 and/or reception buffers 202 may be deleted where necessary after the data is transmitted.

<Operation of Data Delivery Device>

Next, with reference to FIGS. 3 and 4, an example will be described in which delivery data 310 that is viewed and/or listened in an aircraft is transmitted by wireless from transmission device 100 installed at an airport to reception device 200 installed in the aircraft. Note that delivery data 310 has been transmitted from delivery data server 300 to transmission data storage unit 101 of transmission device 100 before the aircraft arrives at the airport.

Control station 301 transmits a transmission reservation of delivery data 310 to transmission device 100 via internet network 302 (S100).

Upon receiving the transmission reservation of delivery data 310 in S100, distribution controller 105 of transmission device 100 duplicates delivery data 310 in transmission data storage unit 101, for which the transmission reservation has been made, transmits the duplicated data to each of transmission buffers 102A to 102D via wired LAN 111, and stores the duplicated data in each of the transmission buffers 102A to 102D (S101). The communication speed of wired LAN 111 is slower than the communication speed of wireless links 400. Therefore, distribution controller 105 executes processing of S101 before the aircraft arrives at the airport.

After the aircraft arrives and a boarding bridge is connected to the aircraft, reception controller 205 of reception device 200 transmits a wireless link connection request to transmission device 100 (S102). The wireless link connection request is transmitted from, for example, one of a plurality of reception antennas 204A to 204D.

Transmission device 100 that has received the wireless link connection request and reception device 200 that has transmitted the wireless link connection request exchange control packets with each other and establish wireless links 400A to 400D of a plurality of systems (S103).

Next, transmission controller 106 transmits a transmission preparation request of delivery data 310 to reception device 200 (S104). Upon receiving the transmission preparation request, reception controller 205 prepares to receive delivery data 310.

Next, transmission controller 106 instructs wireless transmitters 103A, 103B, 103C, 103D to transmit the delivery data (duplicated data) in transmission buffers 102A, 102B, 102C, 102D, respectively (S105). Note that transmission controller 106 adjusts data to be read from transmission buffers 102A, 102B, 102C, 102D such that an overlap of data to be stored in reception buffers 202A, 202B, 202C, 202D does not occur.

After receiving the instruction, wireless transmitters 103A, 103B, 103C, 103D read the delivery data (duplicated data) from transmission buffers 102A, 102B, 102C, 102D and transmit the delivery data via wireless links 400A, 400B, 400C, 400D, respectively.

In this way, wireless transmitters 103A, 103B, 103C, 103D can read the delivery data from transmission buffers 102A, 102B, 102C, 102D, respectively. Therefore, wireless transmission of data can be performed at a high speed without being controlled by the communication speed of wired LAN 111. Note that wireless receivers 203A, 203B, 203C, 203D store the delivery data received via wireless links 400A, 400B, 400C, 400D in reception buffers 202A, 202B, 202C, 202D, respectively.

After each of wireless receivers 203 receives the delivery data, reception controller 205 transmits the delivery data in each of reception buffers 202 to reception data storage unit 201 via wired LAN 211, and stores and combines the delivery data (S405). In this way, delivery data 310 is stored in reception data storage unit 201. Note that a time for executing this combining processing is not limited to the time during which the aircraft is staying at an airport. The processing may be executed after the aircraft takes off.

Modification of First Exemplary Embodiment

Next, a modification of the first exemplary embodiment will be described below.

Figure 4:
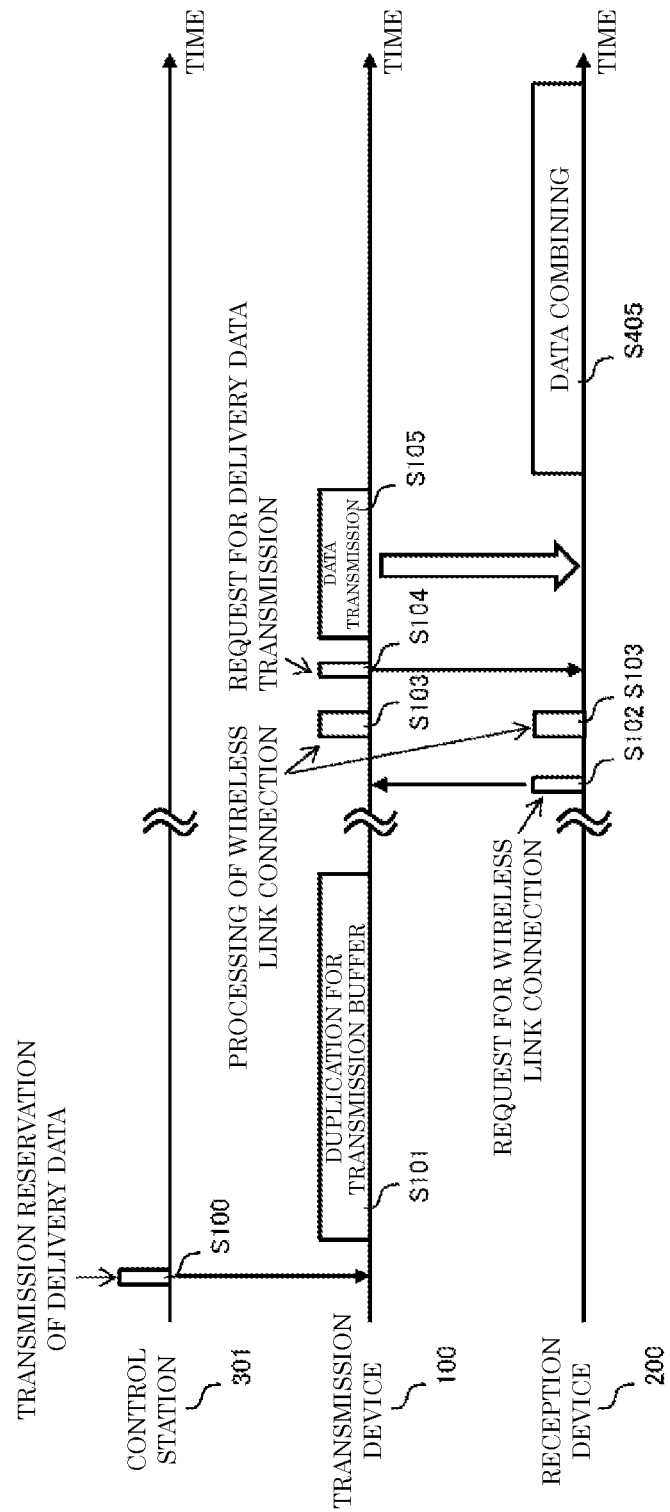
FIG. 4 is a diagram illustrating an operation example of the transmission device and the reception device according to the first exemplary embodiment.

In wireless communication processing of S105 in FIG. 4, transmission controller 106 instructs each of wireless transmitters 103 to transmit data of a non-transmitted part among the delivery data in transmission buffers 102.

For example, in a case where data to be transmitted by wireless transmitters 103A, 103B, 103C, 103D is predetermined, transmission controller 106 confirms progress of each of wireless transmitters 103 and instructs wireless transmitters 103 whose transmission speeds are fast to transmit data of a non-transmitted part of other wireless transmitters 103.

In this way, transmission device 100 can efficiently use wireless links 400 of the plurality of systems and finish transmitting delivery data 310 to reception device 200 in a shorter period of time. For example, within a limited amount of time during which the aircraft is staying at an airport, transmission device 100 can finish transmitting a large volume of delivery data 310 to reception device 200 in the aircraft.

Effects of First Exemplary Embodiment

In the first exemplary embodiment, before wireless links 400 are established, transmission device 100 distributes a duplicate of delivery data 310 in transmission data storage unit 101 to each of transmission buffers 102. After a plurality of wireless links 400 is established with reception device 200, transmission device 100 then transmits by wireless the delivery data (duplicated data) in each of transmission buffers 102 to reception device 200 via each of wireless links 400.

In this way, transmission device 100 can transmit delivery data 310 by wireless to reception device 200 at a high speed (in a short period of time) without being determined by the communication speed between transmission data storage unit 101 and transmission buffers 102. This is useful for a case where a large volume of delivery data 310 needs to be transmitted by wireless to reception device 200 within a predetermined time such as within a time during which an aircraft is staying at an airport, or within a time during which a train is stopping at a station.

Second Exemplary Embodiment

In a second exemplary embodiment, transmission device 100 will be described that divides delivery data 310, distributes each piece of division data to transmission buffers 102, and transmits the data by wireless. Note that in the second exemplary embodiment, portions different from the first exemplary embodiment will be described, and portions common to those in the first exemplary embodiment will be omitted.

<Division of Delivery Data>

Next, with reference to FIGS. 5 and 6, division of delivery data 310 will be described.

Figure 5:
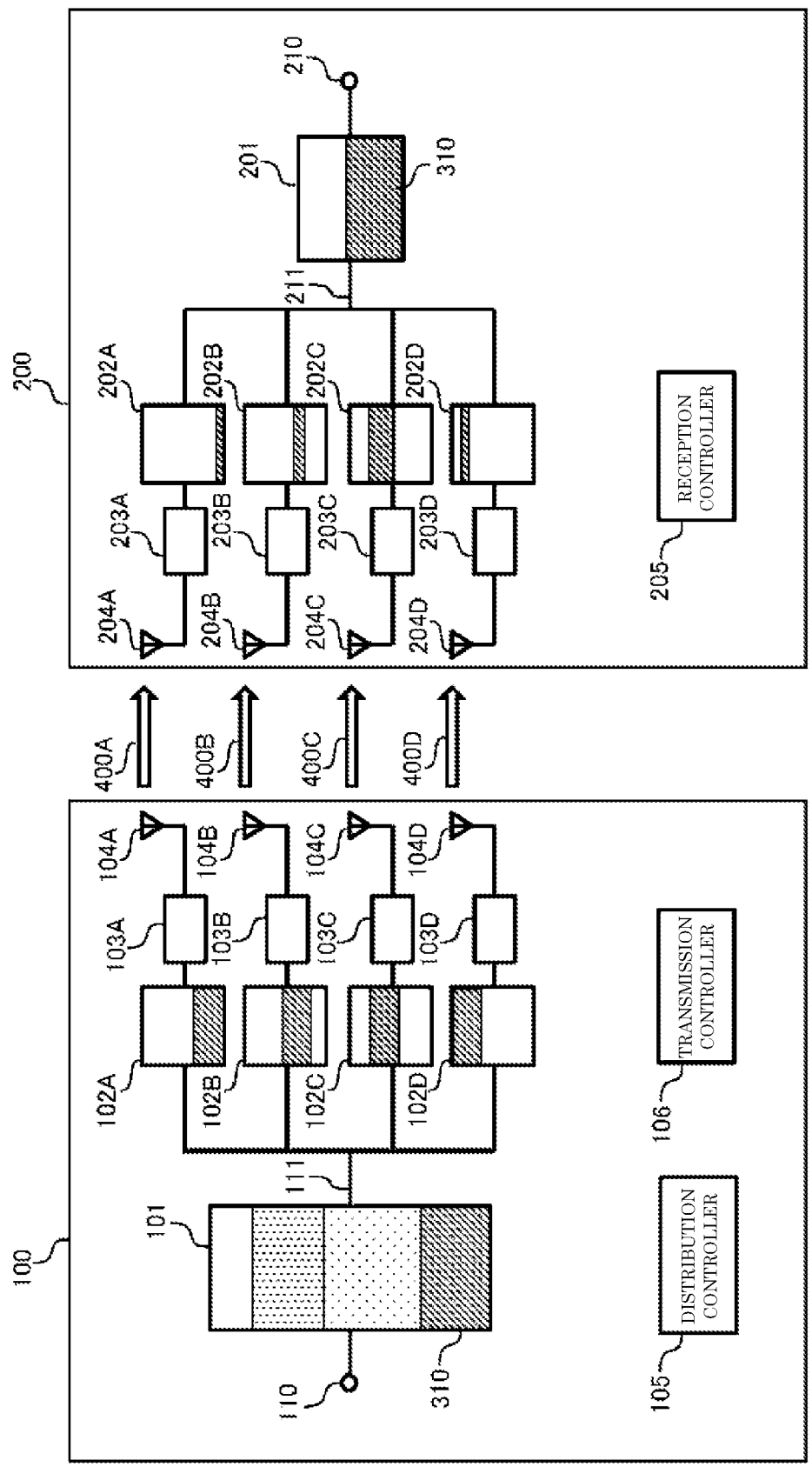
FIG. 5 is a block diagram illustrating a configuration example of a transmission device and a reception device according to a second exemplary embodiment.

Distribution controller 105 divides delivery data 310 in transmission data storage unit 101 into four pieces of division data, and as illustrated in FIG. 5, stores these four pieces of division data in transmission buffers 102A, 102B, 102C, 102D, respectively. Note that a number of divisions of delivery data 310 corresponds to a number of systems N of wireless links 400. This means that, in the case of FIG. 5, the number of systems N of wireless links 400 is 4, and thus distribution controller 105 divides delivery data 310 into four pieces of division data. Note that in FIG. 5, since different data is stored, positions of hatched portion of transmission buffers 102A, 102B, 102C, 102D are different from each other.

<Overlapping Division of Delivery Data>

Figure 6:
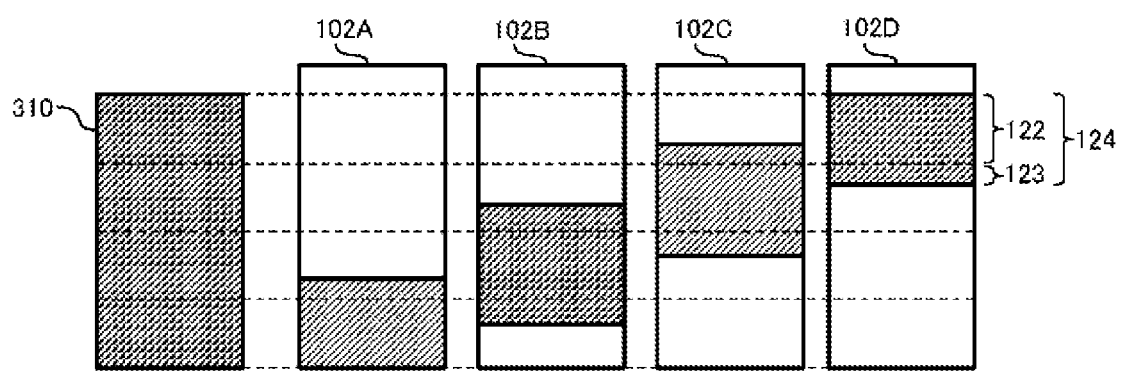
FIG. 6 is a diagram illustrating an example of an overlapping division of delivery data according to the second exemplary embodiment.

As illustrated in FIG. 6, distribution controller 105 may add overlapping data 123, which is same data as a part of other division data, to division data 122. Hereinafter, division data 122 to which overlapping data 123 is added may be referred to as overlapping division data 124. A ratio of overlapping data 123 is determined, for example, as follows.

The ratio of one piece of division data 122 to entire delivery data 310 is assumed to be a %. In this case, the ratio of overlapping data 123 to be added to division data 122 (hereinafter referred to as "overlapping ratio") may be set between 0% to (100−α)% inclusive. This means that when the overlapping ratio is 0%, overlapping data 123 is not added to division data 122, and "overlapping division data=division data" applies. That is, the data of transmission buffers 102 are all different.

Moreover, when the overlapping ratio is (100−α)%, all data other than division data 122 of delivery data 310 is added to division data 122 as overlapping data 123, and "overlapping division data=delivery data" applies. That is, the data of transmission buffers 102 are all the same. Moreover, when the overlapping ratio is 10%, 10% of overlapping data 123 other than division data 122 of delivery data 310 is added to division data 122.

The overlapping ratio is set according to variation (for example, dispersion) of the communication speeds of wireless links 400. For example, when 10% of variation is generated in the communication speeds of wireless links 400, the overlapping ratio is set to "10%". Accordingly, when the variation in the communication speeds of wireless links 400 is relatively large, overlapping division data 124 having a relatively large overlapping ratio is stored in transmission buffers 102. On the other hand, when the variation in the communication speeds of wireless links 400 is relatively small, overlapping division data 124 having a relatively small overlapping ratio is stored in transmission buffers 102. Note that the overlapping ratio is preset according to a predicted value of the variation of wireless links 400. However, the overlapping ratio may be set or changed appropriately according to a measured value of the variation of wireless links 400.

Each of wireless transmitters 103 transmits overlapping division data 124 in transmission buffers 102 via wireless links 400. At this time, transmission controller 106 first instructs wireless transmitters 103 to transmit non-overlapping data (that is, data corresponding to division data 122) among the overlapping division data 124 in transmission buffers 102. Next, transmission controller 106 instructs wireless transmitters 103 that have completed the transmission of non-overlapping data to transmit overlapping data 123.

In this way, in a case where the communication speed is deviated to a high speed in certain wireless link 400, and transmission of non-overlapping data is completed earlier than other wireless links 400, overlapping data 123 can be transmitted by wireless. As a result, compared to a case where overlapping data 123 is not added to division data 122, the time required for wireless transmission of delivery data 310 can be shortened.

In a case where the communication speed is deviated to a low speed in certain wireless link 400, even if transmission of overlapping division data 124 is completed in other wireless links 400, non-overlapping and non-transmitted data may remain in transmission buffer 102 that corresponds to certain wireless link 400. In this case, distribution controller 105 transmits at least a part of the non-overlapping and non-transmitted data to transmission buffers 102 that have completed transmission. Alternatively, distribution controller 105 transmits at least a part of the non-overlapping and non-transmitted data from transmission data storage unit 101 to transmission buffers 102 that have completed transmission. Transmission controller 106 then instructs wireless transmitters 103 that have completed the transmission to transmit wireless delivery data in such transmission buffers 102.

As a result, although time is required for transmitting at least a part of the non-overlapping and non-transmitted data to transmission buffers 102 that have completed transmission, transmission device 100 can efficiently use each of wireless links 400, and shorten the time required for wireless transmission of delivery data 310.

Effects of Second Exemplary Embodiment

In the second exemplary embodiment, before wireless links 400 are established, transmission device 100 divides delivery data 310 in transmission data storage unit 101, and stores division data 122 generated in such a manner in each of transmission buffers 102. After a plurality of wireless links 400 is established with reception device 200, transmission device 100 then transmits by wireless division data 122 in each of transmission buffers 102 to reception device 200 via each of wireless links 400.

As a result, compared to a case where duplicated data of delivery data 310 is transmitted to and stored in each of transmission buffers 102, transmission device 100 can shorten the time required for transmitting data from transmission data storage unit 101 to each of transmission buffers 102. Moreover, capacity of each of transmission buffers 102 can be decreased.

Moreover, before wireless links 400 are established, transmission device 100 adds overlapping data 123 to division data 122 and distributes overlapping division data 124 generated in such a manner to each of transmission buffers 102. After the plurality of wireless links 400 is established with reception device 200, transmission device 100 then transmits non-overlapping data by wireless as a priority from each of transmission buffers 102, and then transmits overlapping data 123 by wireless.

In this way, in a case where variation of the communication speed is deviated to a high speed in certain wireless link 400, and transmission of non-overlapping data is completed earlier than other wireless links 400, transmission device 100 can transmits overlapping data 123 by wireless transmission. As a result, compared to a case where overlapping data 123 is not added to division data 122, transmission device 100 can shorten the time required for wireless transmission of delivery data 310.

Third Exemplary Embodiment

In a third exemplary embodiment, transmission device 100 will be described that weights a division ratio of division data 122 according to the communication speed of wireless links 400. Note that in the third exemplary embodiment, portions different from the second exemplary embodiment will be described, and portions common to those in the second exemplary embodiment will be omitted.

<Weighting Division of Delivery Data>

Next, with reference to FIGS. 7 and 8, weighting division of delivery data 310 will be described.

Figure 7:
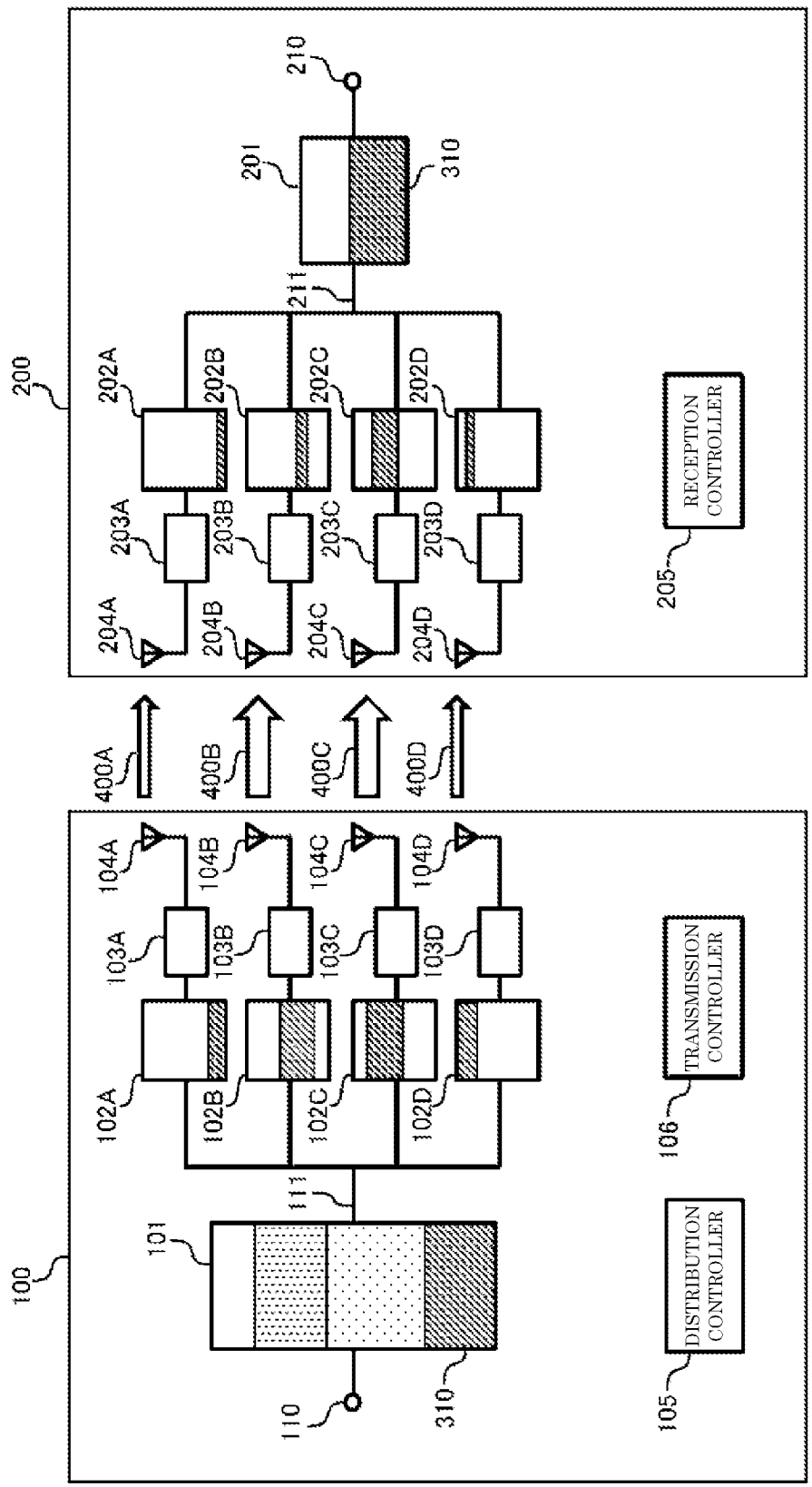
FIG. 7 is a block diagram illustrating a configuration example of a transmission device and a reception device according to a third exemplary embodiment.

Distribution controller 105 weights a division size and divides delivery data 310 stored in transmission data storage unit 101 into four pieces of division data 125, and as illustrated in FIG. 7, stores these pieces of division data 125 in transmission buffers 102A, 102B, 102C, 102D, respectively. Note that similar to FIG. 5, the number of divisions of delivery data 310 corresponds to the number of the systems N of wireless links 400. Hereinafter, division data, which is weighted and divided, is referred to as weighting division data 125.

Distribution controller 105 determines the size of weighting according to the communication speed of each of wireless links 400. The communication speed of wireless link 400 may be an estimated value that is calculated based on a measurement result of hardware, which has been obtained in advance, or a result of the last wireless communication. For example, distribution controller 105 determines the size of weighting in proportion to the communication speed of each of wireless links 400. A specific example will be described below.

Figure 8:
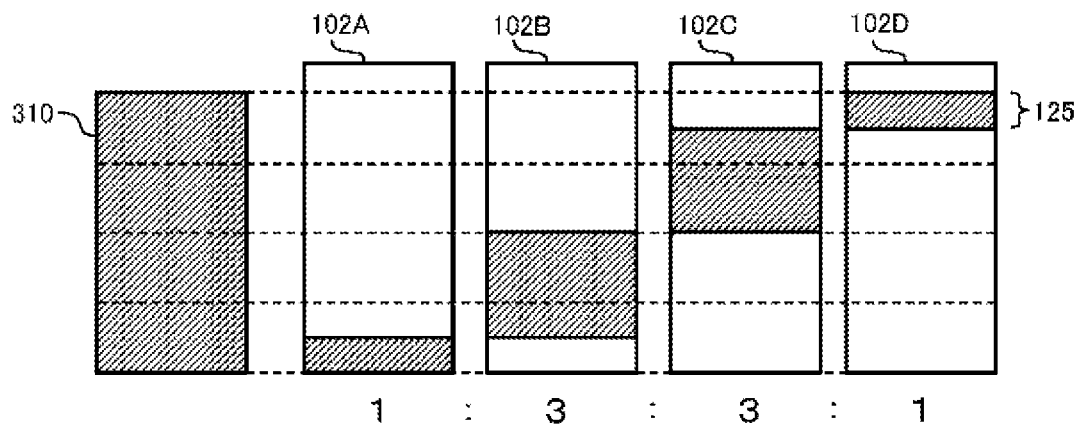
FIG. 8 is a diagram illustrating an example of a weighting division of delivery data according to the third exemplary embodiment.

In FIGS. 7 and 8, the ratio of the communication speeds of wireless links 400A, 400B, 400C, 400D is 1:3:3:1. As illustrated in FIG. 8, distribution controller 105 weights a division size in the ratio of 1:3:3:1, divides delivery data 310 into four pieces of weighting division data 125, and distributes these four pieces of weighting division data 125 to transmission buffers 102A, 102B, 102C, 102D, respectively. Note that in FIGS. 7 and 8, since different data is stored, positions of hatched portion of transmission buffers 102A, 102B, 102C, 102D are different from each other.

In this way, transmission device 100 can transmit by wireless weighting division data 125 having a relatively large division size via wireless links 400 whose communication speeds are relatively fast, and transmit by wireless weighting division data 125 having a relatively small size via wireless links 400 whose communication speeds are relatively slow. As a result, compared to a case where delivery data 310 is divided in the same ratio, transmission device 100 can shorten the time required for completing wireless transmission of delivery data 310 to reception device 200.

Note that as described in the second exemplary embodiment, distribution controller 105 may add overlapping data 123 to weighting division data 125.

Effects of Third Exemplary Embodiment

In the third exemplary embodiment, before wireless links 400 are established, transmission device 100 weights delivery data 310 in transmission data storage unit 101 in a ratio according to the communication speed of each of wireless links 400, divides delivery data 310, and distributes weighting division data 125 generated in such a manner to each of transmission buffers 102. After a plurality of wireless links 400 is established with reception device 200, transmission device 100 then transmits by wireless weighting division data 125 in each of transmission buffers 102 to reception device 200 via each of wireless links 400.

In this way, transmission device 100 can transmit by wireless weighting division data 125 having a relatively large division size via wireless links 400 whose communication speeds are relatively fast, and transmit by wireless weighting division data 125 having a relatively small size via wireless links 400 whose communication speeds are relatively slow. As a result, compared to a case where delivery data 310 is divided in the same ratio, in a case where the communication speeds of wireless links 400 are different from each other, the data delivery system can shorten the time required for completing wireless transmission of delivery data 310.

The exemplary embodiments according to the present disclosure have been described above with reference to the drawings. Functions of transmission device 100, reception device 200, delivery data server 300, and control station 301 described above are achieved by computer programs.

Figure 9:
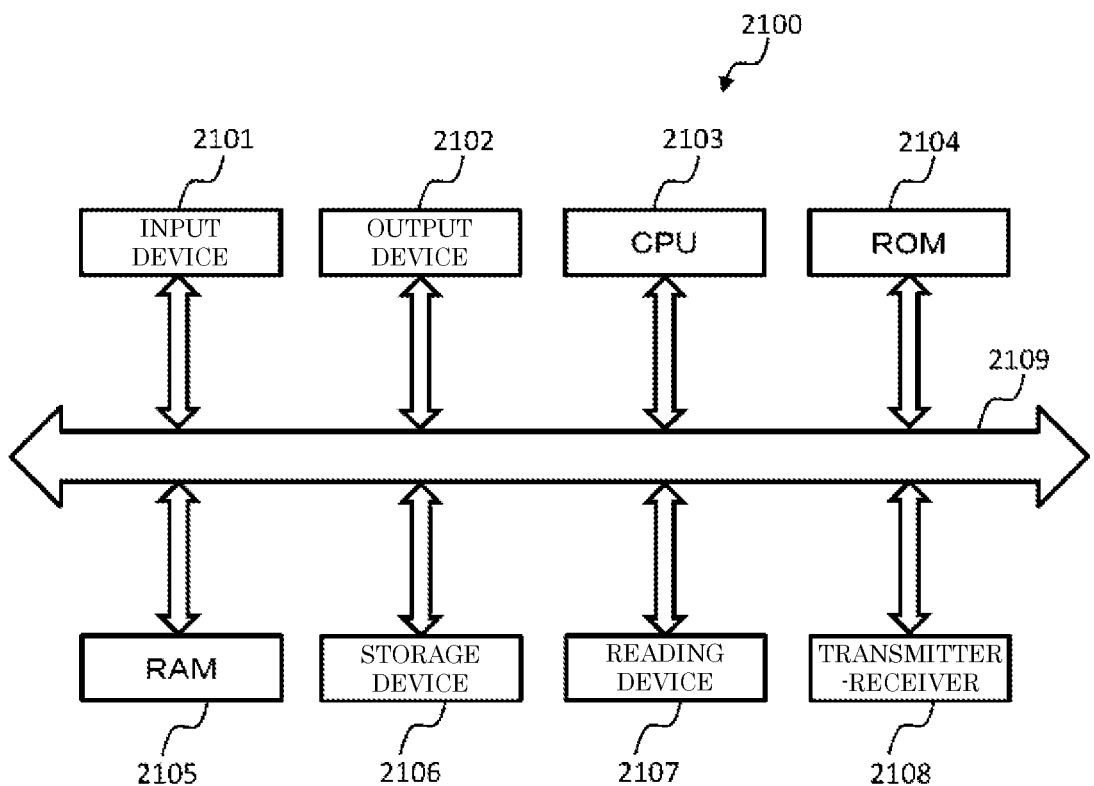
FIG. 9 is a diagram illustrating an example of a hardware configuration according to the exemplary embodiment of the present disclosure.

FIG. 9 is a hardware configuration of a computer that achieves a function of each device by a program. This computer 2100 includes input device 2101 such as a keyboard, a mouse, or a touch pad, output device 2102 such as a display or a speaker, central processing unit (CPU) 2103, read only memory (ROM) 2104, random access memory (RAM) 2105, storage device 2106 such as a hard disk device or a solid state drive (SSD), reading device 2107 that reads information from a recording medium such as a digital versatile disk read only memory (DVD-ROM) or a universal serial bus (USB) memory, and transmitter-receiver 2108 that performs communication via a network, and each unit is connected via bus 2109.

From a recording medium that has recorded a program for achieving a function of each of the devices described above, reading device 2107 reads the program and stores the program in storage device 2106. Alternatively, transmitter-receiver 2108 performs communication with a server device connected to a network and stores in storage device 2106 the program downloaded from the server device for achieving a function of each of the devices described above.

CPU 2103 then makes a copy of the program stored in storage device 2106 in RAM 2105, sequentially reads instructions included in the program from RAM 2105, and executes the instructions to achieve the function of each of the devices described above.

The functional blocks used in the descriptions of the exemplary embodiments described above can be typically implemented as a large-scale integration (LSI) that is an integrated circuit. The functional blocks may be individually implemented as separate chips or some or all of the functional blocks may be integrated into one chip. Here, an LSI is exemplified, but the LSI may be referred to as an integrated circuit (IC), a system LSI, a super LSI, or an ultra LSI depending on the difference in the degree of integration.

Further, the circuit integration is not necessarily implemented by an LSI, and may be implemented by a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

Further, when there emerges a technique for circuit integration that replaces the LSI as a result of the advancement of semiconductor technology or other derivative technology, the functional blocks may be integrated by using that technique. Application of biotechnology or the like may be possible. In the descriptions above, the expression of "unit" used for the components may be replaced by another expression such as "circuitry", "device", or "module".

The present disclosure is applicable to a transmission device, a transmission method, a reception device and a reception method that are used for delivery data transmission by wireless.

What is claimed is:

1. A transmission device comprising: N wireless transmission circuits configured to establish wireless links with a reception device, and to transmit a piece of delivery data to the reception device, N being an integer equal to or greater than two; N transmission buffers configured to couple to the N wireless transmission circuits, each of the N transmission buffers being coupled to a respective one of the N wireless transmission circuits; data storage configured to couple to the N transmission buffers via a wired local area network (LAN), a communication speed of the wired LAN being slower than a communication speed of a wireless link; distribution control circuitry configured to store at least a part of the piece of delivery data in each of the N transmission buffers from the data storage before the N wireless transmission circuits establish the wireless links; and transmission control circuitry configured to instruct the N wireless transmission circuits to transmit the piece of delivery data stored in the N transmission buffers after the N wireless transmission circuits establish the wireless links, wherein the distribution control circuitry divides the piece of delivery data into a plurality of pieces of division data, and stores the plurality of pieces of division data in the N transmission buffers, wherein the distribution control circuitry adds, to each of the plurality of pieces of division data stored in a respective transmission buffer of the N transmission buffers, a piece of overlapping data that is a part of another piece of division data, the other piece of division data being one of the plurality of pieces of division data stored in another transmission buffer of the N transmission buffers, and wherein the transmission control circuitry instructs to give priority on transmission to a non-overlapping part of the each of the plurality of pieces of division data stored in the respective transmission buffer of the N transmission buffers, the non-overlapping part being a part of the each of the plurality of pieces of division data that does not overlap with other pieces of division data of the plurality of pieces of division data stored in the N transmission buffers other than the respective transmission buffer.

2. The transmission device according to claim 1, wherein the distribution control circuitry stores a piece of duplicated data of the piece of delivery data in each of the N transmission buffers.

3. The transmission device according to claim 1, wherein the distribution control circuitry determines a ratio of a size of each of the plurality of pieces of the division data with respect to a size of the piece of delivery data based on a communication speed of a wireless link associated with a respective transmission buffer of the N transmission buffers.

4. The transmission device according to claim 1, wherein the transmission control circuitry instructs to give priority on transmission to a non-transmitted part of the part of the piece of delivery data stored in each of the N transmission buffers, the non-transmitted part being a part of the piece of delivery data that has not been transmitted yet.

5. A transmission method of a transmission device that establishes N wireless links with a reception device, and transmits a piece of delivery data to the reception device, N being an integer equal to or greater than two, the transmission method comprising: dividing the piece of delivery data into a plurality of pieces of division data; storing, before the N wireless links are established, at least a part of the piece of division data in each of N transmission buffers from data storage via a wired local area network (LAN); adding, to each of the plurality of pieces of division data stored in a respective transmission buffer of the N transmission buffers, a piece of overlapping data that is a part of another piece of division data, the other piece of division data being one of the plurality of pieces of division data stored in another transmission buffer of the N transmission buffers; and transmitting, after the N wireless links are established, the plurality of pieces of division data stored in each of the N transmission buffers via a respective one of the N wireless links with priority given to transmission to a non-overlapping part of the each of the plurality of pieces of division data stored in the respective transmission buffer of the N transmission buffers, wherein each of the N transmission buffers is associated with the respective one of the N wireless links, and a communication speed of the wired LAN being slower than a communication speed of a wireless link, wherein the non-overlapping part is a part of the each of the plurality of pieces of division data that does not overlap with other pieces of division data of the plurality of pieces of division data stored in the N transmission buffers other than the respective transmission buffer.

* * * * *